US008155198B2

(12) United States Patent
Yamasaki et al.

(10) Patent No.: US 8,155,198 B2
(45) Date of Patent: Apr. 10, 2012

(54) INTERPOLATED FRAME GENERATING METHOD AND INTERPOLATED FRAME GENERATING APPARATUS

(75) Inventors: Masaya Yamasaki, Hachioji (JP); Yohei Hamakawa, Fussa (JP); Atsuo Shono, Tachikawa (JP); Hiroshi Yoshimura, Saitama (JP); Keiko Hirayama, Tokyo (JP); Ko Sato, Ome (JP); Kenichi Douniwa, Asaka (JP); Yoshihiko Ogawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1150 days.

(21) Appl. No.: 11/950,988

(22) Filed: Dec. 5, 2007

(65) Prior Publication Data

US 2008/0137747 A1 Jun. 12, 2008

(30) Foreign Application Priority Data

Dec. 8, 2006 (JP) ................................. 2006-332384

(51) Int. Cl.
*H04N 7/12* (2006.01)
*G06K 9/36* (2006.01)
(52) U.S. Cl. .................................. 375/240.16; 382/236
(58) Field of Classification Search ........................ None
See application file for complete search history.

(56) References Cited

U.S. PATENT DOCUMENTS

| 5,561,475 | A | * | 10/1996 | Jung | 348/699 |
| 5,646,691 | A | * | 7/1997 | Yokoyama | 348/416.1 |
| 6,091,460 | A | * | 7/2000 | Hatano et al. | 348/699 |
| 6,590,937 | B1 | * | 7/2003 | Ogura et al. | 375/240.16 |
| 6,636,267 | B1 | * | 10/2003 | Adachi | 348/448 |
| 6,678,330 | B1 | * | 1/2004 | Kondo et al. | 375/240.24 |
| 6,842,483 | B1 | * | 1/2005 | Au et al. | 375/240.16 |
| 6,968,010 | B2 | * | 11/2005 | Chelladurai et al. | 375/240.16 |
| 7,079,579 | B2 | * | 7/2006 | Han et al. | 375/240.16 |
| 7,236,634 | B2 | * | 6/2007 | Miyakoshi et al. | 382/236 |
| 2004/0247029 | A1 | * | 12/2004 | Zhong et al. | 375/240.16 |
| 2004/0252895 | A1 | * | 12/2004 | Hur et al. | 382/236 |
| 2005/0025244 | A1 | * | 2/2005 | Lee et al. | 375/240.16 |
| 2005/0265451 | A1 | * | 12/2005 | Shi et al. | 375/240.15 |
| 2006/0072664 | A1 | * | 4/2006 | Kwon et al. | 375/240.16 |
| 2006/0262853 | A1 | * | 11/2006 | Li et al. | 375/240.16 |
| 2007/0140346 | A1 | * | 6/2007 | Chen et al. | 375/240.16 |
| 2008/0123743 | A1 | * | 5/2008 | Douniwa et al. | 375/240.15 |

FOREIGN PATENT DOCUMENTS

JP 64-073985 3/1989

(Continued)

*Primary Examiner* — Hassan Phillips
*Assistant Examiner* — Hicham Foud
(74) *Attorney, Agent, or Firm* — Pillsbury Winthrop Shaw Pittman, LLP

(57) ABSTRACT

According to one embodiment, interpolated frame generating method of generating a new interpolated frame inserted between sequential frames, by using a plurality of input frame images, comprises first detecting of detecting at least one potential motion vector by block matching between the input frame images, using a first block of a fixed size, second detecting of detecting a motion vector by block matching between the input frame images, using a second block having a size variable within a range larger than that of the first block, and generating the interpolated frame by using the potential motion vector. The generating is generating the interpolated frame by using a potential motion vector closest to the motion vector detected by the second detecting among the potential motion vectors when a plurality of motion vectors are detected by the first detecting.

12 Claims, 5 Drawing Sheets

FOREIGN PATENT DOCUMENTS

| | | |
|---|---|---|
| JP | 64-080186 | 3/1989 |
| JP | 06-153185 | 5/1994 |
| JP | 2005-006275 | 1/2005 |
| JP | 2005-056410 | 3/2005 |
| JP | 2005-268912 | 9/2005 |
| JP | 2006-208792 | 8/2006 |

* cited by examiner

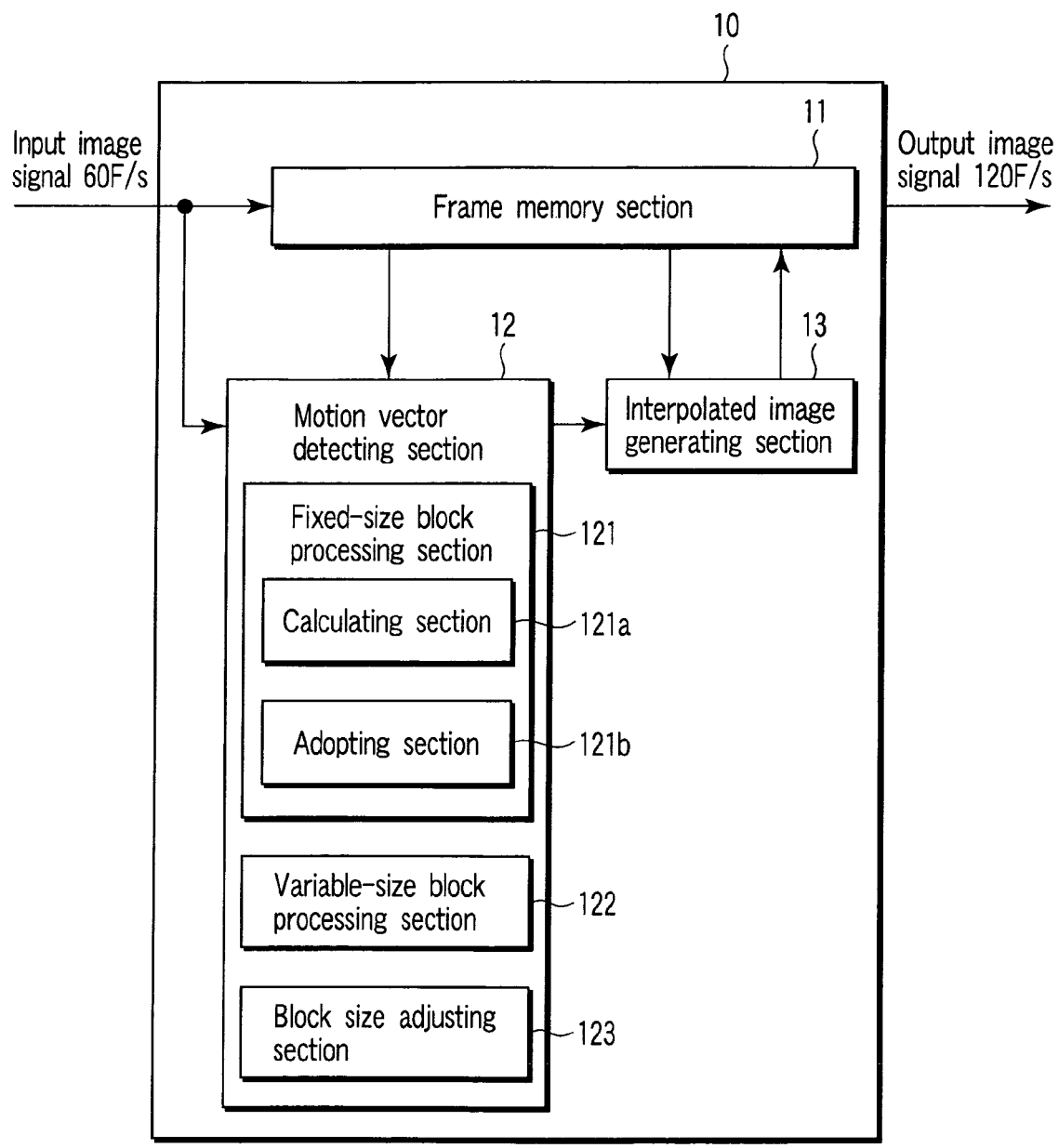
F I G. 1

INTERPOLATED FRAME GENERATING METHOD AND INTERPOLATED FRAME GENERATING APPARATUS

CROSS-REFERENCE TO RELATED APPLICATIONS

This application is based upon and claims the benefit of priority from Japanese Patent Application No. 2006-332384, filed Dec. 8, 2006, the entire contents of which are incorporated herein by reference.

BACKGROUND

1. Field

One embodiment of the present invention relates to a technique of generating and inserting an interpolated frame between frame images forming moving images, and displaying movement of an object as smooth and natural movement.

2. Description of the Related Art

When moving images are displayed on a liquid crystal display (LCD), the LCD displays frame images (hereinafter simply referred to as "frames") at a rate of, for example, 60 frames/second. The frames are sequential scanning images obtained by processing interlaced signals of 60 fields/second. Specifically, LCDs display one frame for 1/60 second.

When such images displayed on LCDs are viewed, an image of previous frame is left as persistence of vision for viewer's eyes. Therefore, there are cases where a moving object in the images appears blurred, or movement of the object appears unnatural. Such a phenomenon appears more conspicuously in larger screens.

To prevent such blurring of moving images, there is a known method of displaying moving images by inserting an interpolated frame between two sequential frames (refer to Jpn. Pat. Appln. KOKAI Pub. No. 2005-6275). In the method of the document, matching of image blocks forming frames is performed between two input frames including a prior frame and a subsequent frame or more input frames, and thereby a motion vector of each block (direction and distance of movement of the object) is detected. A new interpolated frame located between the input frames is generated by using the motion vector of each block. The interpolated frame is inserted between the two input frames, and thereby moving images are displayed with increased number of frames.

The above block matching is a method of detecting which image block in a subsequent frame an image block of a predetermined size in a frame matches. A difference between a pixel of one image block in the prior frame and a corresponding pixel of any one image block in the subsequent frame is calculated, and an image block of the subsequent frame having minimum cumulative value of difference (sum of absolute difference [SAD]) is detected as an image block which is most similar to the image block of the prior frame. A difference of position between the most similar blocks of the prior frame and the subsequent frame is detected as a motion vector.

When movement of an object is estimated based on block matching using SAD, if a periodical pattern exists in input frames, an accurate motion vector cannot be estimated in image blocks in the periodical pattern. Jpn. Pat. Appln. KOKAI Pub. No. 2005-56410 discloses a technique of correcting a motion vector of an image block with motion vectors of surrounding image blocks, if an observed image is a periodical pattern. Further, a technique of using blocks of two sizes to detect a motion vector is filed as Jpn. Pat. Appln. No. 2006-208792 (filed on Jul. 31, 2006, hereinafter referred to as Reference 3).

As described above, there are known methods of correcting a motion vector of an image block in a periodical pattern by using motion vectors of surrounding blocks. However, these methods cannot provide appropriate correction in cases where the size of the periodical pattern is much larger than an image block. These methods cannot provide appropriate correction also in cases where the motion vectors of surrounding blocks have low reliability. Therefore, these methods have the problem that a reliable motion vector cannot be obtained in the above cases. This problem becomes conspicuous in cases where an image includes many periodical patterns, and it is required to provide any solution to the problem.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram illustrating an embodiment of an interpolated frame generating apparatus according to the present invention;

DETAILED DESCRIPTION

Figure 2:
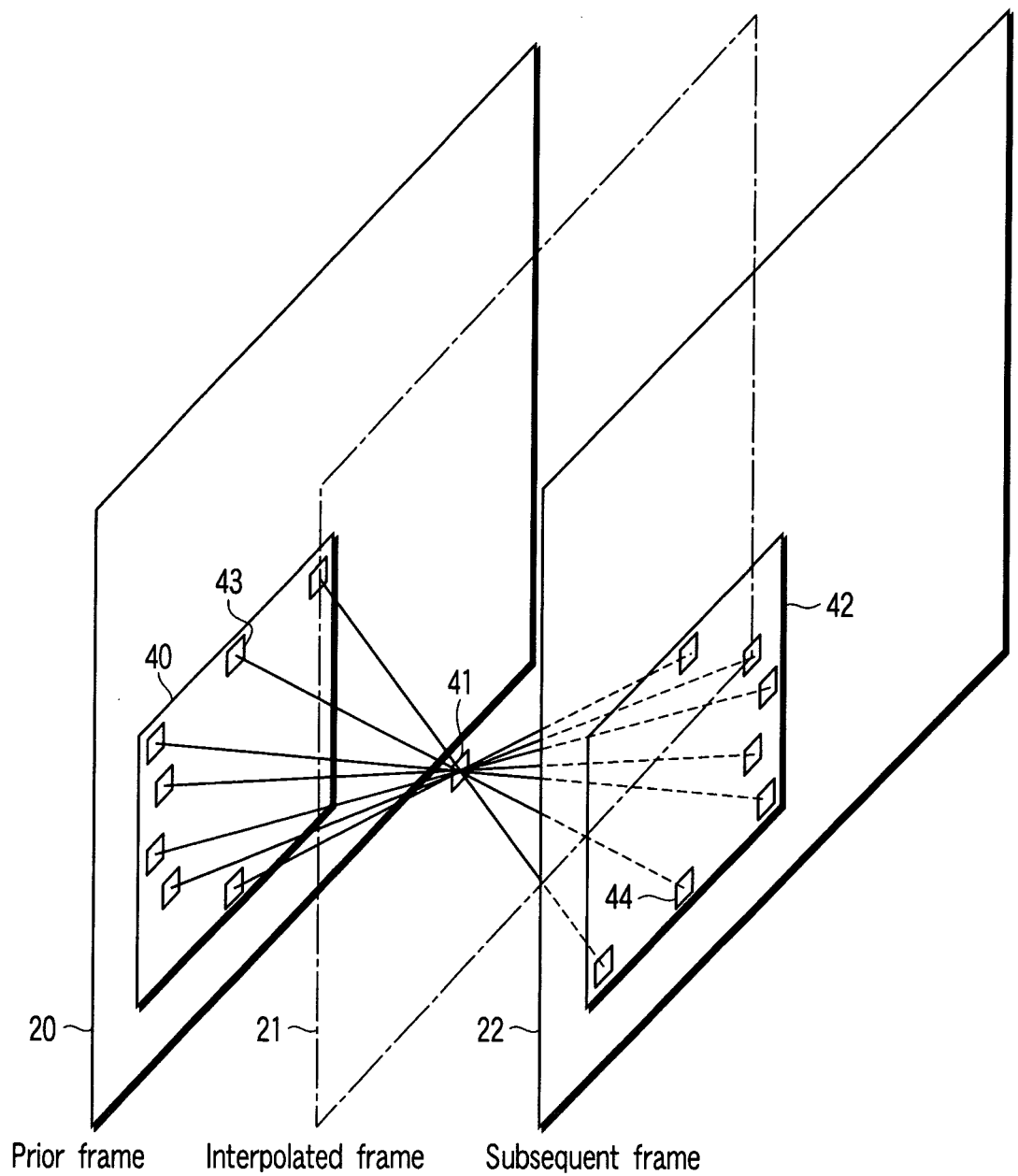
FIG. 2 is a diagram for explaining an example of block matching processing.

Various embodiments according to the invention will be described hereinafter with reference to the accompanying drawings. In general, according to one embodiment of the invention, there is provided an interpolated frame generating method of generating a new interpolated frame inserted between sequential frames, by using a plurality of input frame images, comprising: first detecting of detecting at least one potential motion vector by block matching processing between the input frame images, using a first block of a fixed size; second detecting of detecting a motion vector by block matching processing between the input frame images, using a second block having a size which is variable within a range larger than that of the first block; and generating the interpolated frame by using the potential motion vector when the number of the potential motion vector detected by the first detecting is one, wherein the generating is generating the interpolated frame by using a potential motion vector, which is closest to the motion vector detected by the second detecting among the potential motion vectors, when a plurality of motion vectors are detected by the first detecting.

FIG. 1 is a block diagram illustrating an embodiment of an interpolated frame generating apparatus (frame number changing apparatus) according to the present invention. An interpolated frame generating apparatus 10 includes a frame memory section 11, a motion vector detecting section 12, and an interpolated image generating section 13. The motion vector detecting section 12 detects a motion vector from, for example, two sequential frames in an input image signal by block matching processing. The frame rate of input image signals is, for example, 60 frames/second.

The interpolated image generating section 13 generates an interpolated frame on the basis of a detection result of the motion vector detecting section 12, and inserts the interpolated frame between the two frames. The frame rate of an output image signal, in which interpolated frames are inserted, is 120 frames/second, for example. The motion vector detecting section 12 and the interpolated image generating section 13 can be formed of hardware using individual electronic circuits, or software executed a CPU (not shown).

In the meantime, the motion vector detecting section 12 has a fixed-size block processing section 121, a variable-size block processing section 122, and a block size adjusting section 123, as processing functions relating to the present invention. The fixed-size block processing section 121 detects a potential motion vector by block matching processing using a block of a fixed size (hereinafter referred to as "fixed-size block"). Specifically, the fixed-size block processing section 121 calculates an absolute difference value between corresponding pixel values of image blocks in two input frame images by a calculating section 121a, and adopts a motion vector corresponding to a minimum value of an SAD of the absolute difference values as a potential motion vector by an adopting section 121b.

The variable-size block processing section 122 detects a motion vector by block matching processing using a block of a variable size, which is larger in size than the fixed-size block. The size of the variable-size block is variable, and is adjusted by the block size adjusting section 123. The block size adjusting section 123 adaptively adjusts the size of the variable-size block in accordance with the picture pattern of at least one of the two input frame images relating to the block matching processing.

For example, the block size adjusting section 123 adjusts the size of the variable-size block to a size N times (N is a natural number of 2 or more) as large as the size of the fixed-size block. Specifically, the block size adjusting section 123 generates the variable-size block by connecting a plurality of fixed-size blocks in the longitudinal direction (lateral direction). Preferably, the block size adjusting section 123 adjusts the size of the variable-size block such that only one motion vector is detected by the variable-size block processing section 122, in other words, to set the number of motion vectors detected by the variable-size block processing section 122 to 1.

The interpolated image generating section 13 generates an interpolated frame by using a potential motion vector, when the fixed-size block processing section 121 detects only one potential motion vector. In comparison with this, when a plurality of potential motion vectors are detected, the interpolated image generating section 13 generates an interpolated frame by using a potential motion vector, which is most similar to the motion vector detected by the variable-size block processing section 122 among the potential motion vectors.

FIG. 2 is a diagram illustrating an example of block matching processing. As illustrated in FIG. 2, there is a method of determining a motion vector through block matching processing between image blocks which are symmetric with respect to a point. Specifically, in the method of FIG. 2, an SAD is calculated by comparing image blocks on a prior frame 20 and a subsequent frame 22, which hold an interpolated frame 21 therebetween, pixel by pixel. The image blocks are symmetric with respect to a point in an inserting position of an interpolated image block 41 in an interpolated frame 21. The size of image blocks used in this processing is fixed-length or variable-length. A vector which connects most similar image blocks (that is, having the smallest SAD) is determined as a motion vector. This comparison is performed in a predetermined search range 40 in the prior frame 20 and a search range 42 in the subsequent frame 22, which corresponds to the search range 40.

Supposing that an image block 43 and an image block 44 forms a pair of most similar image blocks, a vector from the image block 43 to the image block 44 is determined as a motion vector of the interpolated image block 41. The interpolated image block 41 in the interpolated frame 21 is generated, on the basis of the motion vector and data of the image blocks 43 and 44.

Figure 3:
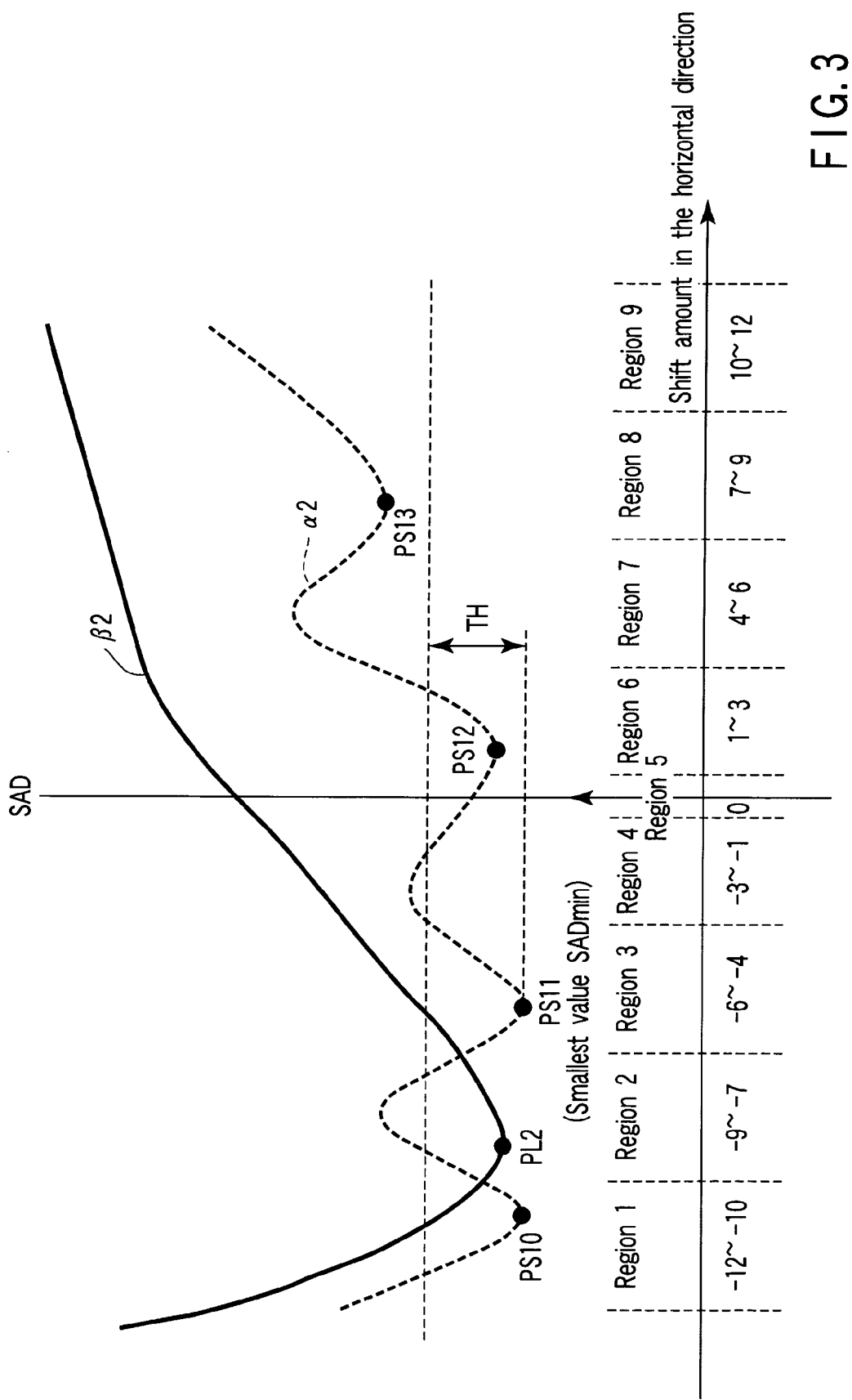
FIG. 3 is a graph illustrating SAD characteristics of block matching processing using a block of a fixed size and a block of a variable size.

FIG. 3 is a graph illustrating relationship (SAD characteristic) between a shift amount of an image block and SAD obtained by block matching using the fixed-size block and block matching using the variable-size block. In FIG. 3, the horizontal axis indicates a horizontal shift amount of an image block, and the vertical axis indicates an SAD. The shift amount indicated by the horizontal axis indicates an image block shift amount on the prior frame 20 or the subsequent frame 22. The shift amount of the horizontal axis is divided into 9 regions (Regions 1 to 9), and Region 5 is a region having 0 shift amount. The curve α2 indicates a result of block matching processing obtained by using the fixed-size block, and the curve β2 indicates a result of block matching processing obtained by using the variable-size block.

Figure 4:
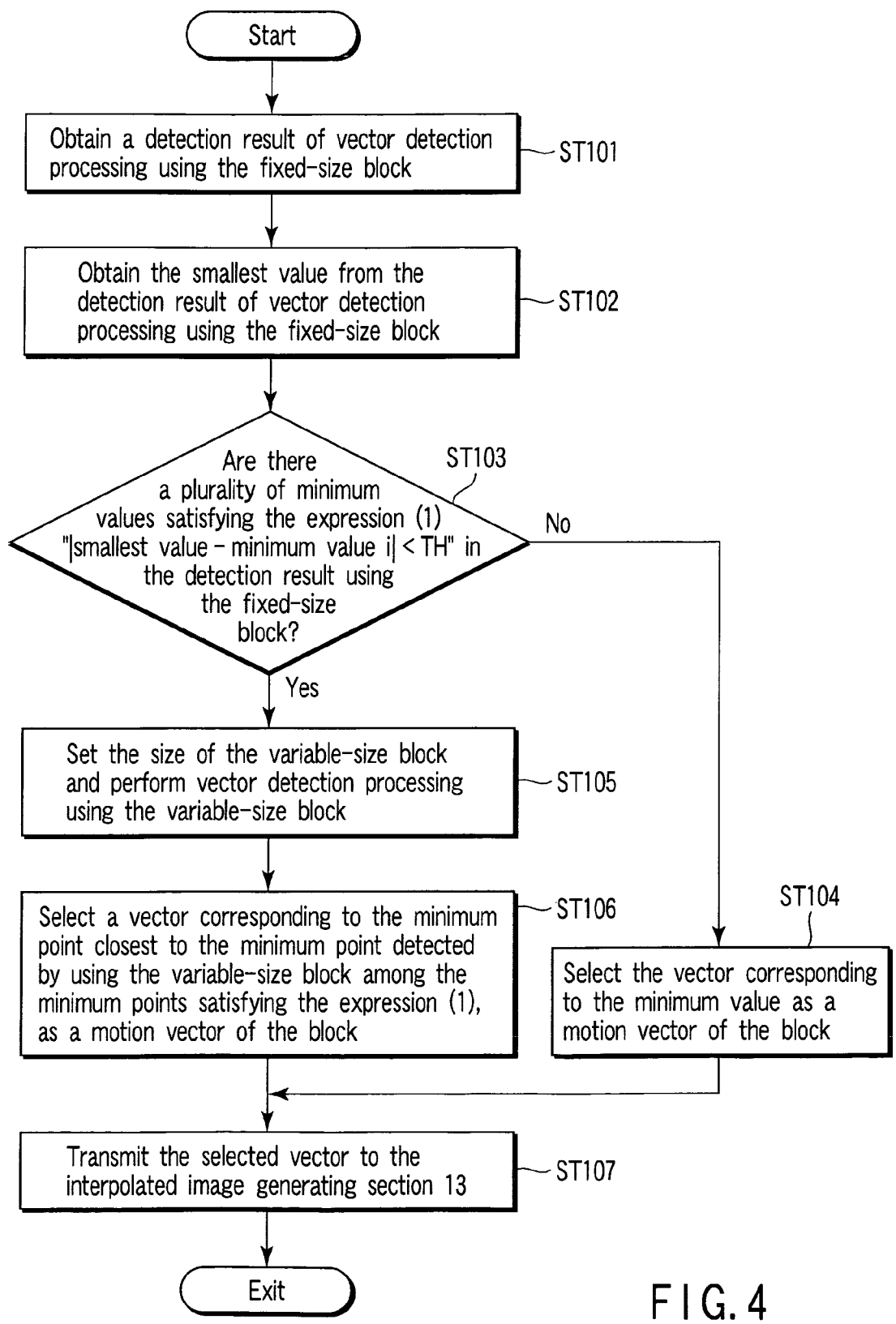
FIG. 4 is a flowchart of a processing procedure of a motion vector detecting section 12 of FIG. 1.

FIG. 4 is a flowchart illustrating a processing procedure of the motion vector detecting section 12 of FIG. 1. The motion vector detecting section 12 obtains a result of detection processing (information of minimum points) of the fixed-size vector processing section 121a (block (ST) 101).

As shown by the curve α2, when the fixed-size block is shifted from −12 pixels to +12 pixels, for example, four minimum points PS10 to PS13 are generated as illustrated in FIG. 3. The motion vector detecting section 12 determines the smallest value SADmin in the whole search region among the group of minimum values of these minimum points supplied from the calculating section 121a (ST102). The motion vector detecting section 12 selects, as reliable potential motion vectors, motion vectors indicated by SAD minimum values (PS10, PS11, PS12) existing in the range TH used for determining the threshold value, that is, minimum values which satisfy the expression "|smallest value−minimum value|<TH . . . (1)". When there is only one reliable potential motion vector (NO of ST103), the adopting section 121b supplies information of the SAD minimum point as the motion vector to the interpolated image generating section 13 (ST104).

In comparison with this, when there are a plurality of reliable motion vectors as shown by the curve α2 of FIG. 3 (YES of ST103), the motion vector detecting section 12 determines that a periodical pattern exists in the search region. Then, the block size adjusting section 123 adaptively sets the size of the variable-size block in accordance with the picture pattern of the image (ST105). Thereafter, block matching processing using the variable-size block is performed by the variable-size block processing section 122. Thereby, the curve indicated by β2 of FIG. 3 is obtained.

Next, the motion vector detecting section 12 adopts a vector corresponding to the minimum value PS10, which is closest to the minimum value PL2 (FIG. 3) detected by using the variable-size block among the reliable potential motion vectors, as a motion vector used for generating the interpolated image block 41 (ST106). Lastly, the motion vector detecting section 12 transmits the adopted (selected) vector to the interpolated image generating section 13 (ST107). The above procedure is repeated each time an image frame is input.

In the method in which sizes of blocks are fixed, even when a large block having a fixed size is used in step ST106, there are cases where a graph having a plurality of minimum points is obtained. In comparison with this, in the above embodiment, the size of one block is adaptively varied in accordance with the picture pattern of the image, and thereby the graph obtained by block matching has only one minimum value.

The processing of step ST105 in FIG. 4 is explained in detail. When a periodical repetitive pattern appears in the picture pattern of the frame image, there are cases where a plurality of minimum points are generated by block matching using the fixed-size block. To deal with this, one minimum point is obtained by using the variable-size block, and a minimum point (obtained by using the fixed-size block) closest to the minimum point of the variable-size block is selected. Thereby, a unique matching result is obtained.

In the method illustrated in FIG. 2, blocks of a predetermined size are moved in parallel on two frames holding an interpolated frame therebetween, with respect to a point in an insertion position of the interpolated frame image. Then, a differential value between pixel values of pixels located in corresponding positions on the two frames is calculated for each of the pixels in the block, and a value (SAD) which is a cumulative sum of the differential values is determined. A direction in which the SAD has a minimum value is determined as a motion vector of the block.

To perform block matching, it is necessary that change of pixel values, by which the shape of an object can be recognized, is included in a block. However, increasing the size of the block too much increases the possibility that a plurality of moving objects are included in the block, and consequently affects the accuracy of matching. Therefore, it is inevitable to limit the block size to a certain size. However, when the image includes a horizontal periodical pattern which is wider than the horizontal size of the block, it is impossible to distinguish the movement of the object from a periodical repetitive pattern of the image, and a motion vector cannot be accurately detected.

Specifically, the optimum block size for accurately detecting a motion vector by block matching varies according to the resolution of the image and movements of objects included in the image. In other words, there is an optimum value of the block size.

When it is considered how to optimize the block size of the variable-size block to accurately detect a motion vector without being confused by periodical repetitive patterns, the width of the variable-size block should be set to a size which includes the whole periodical repetitive pattern.

Figure 5:
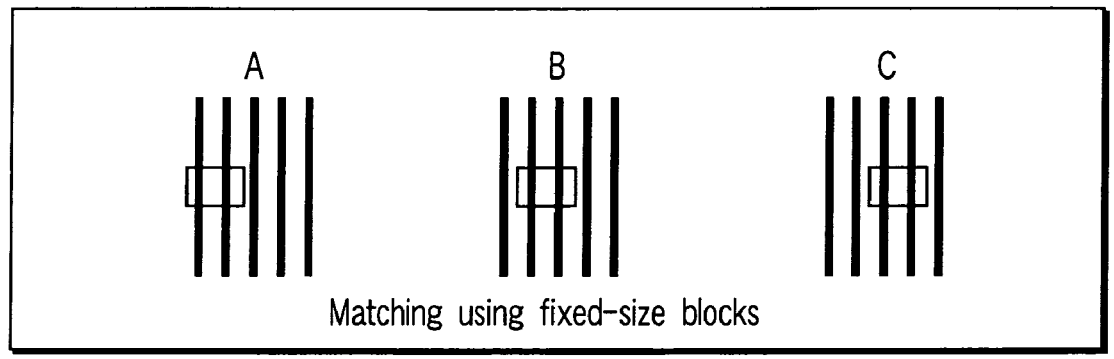
FIG. 5 is a diagram for explaining that accuracy of block matching is influenced by the block size.

This is explained with reference to FIGS. 5 and 6. When fixed-size blocks A, B, and C are used as illustrated in FIG. 5, the picture patterns in rectangular areas of the blocks are the same, and they cannot be distinguished from one another. Specifically, although the SAD value has only one minimum point (=smallest point) in the direction of a vector in general natural images (not including a periodical pattern), the SAD value has minimum points (corresponding to A, B, C of FIG. 5) in directions of a plurality of vectors in the search range in images including a periodical pattern.

Figure 6:
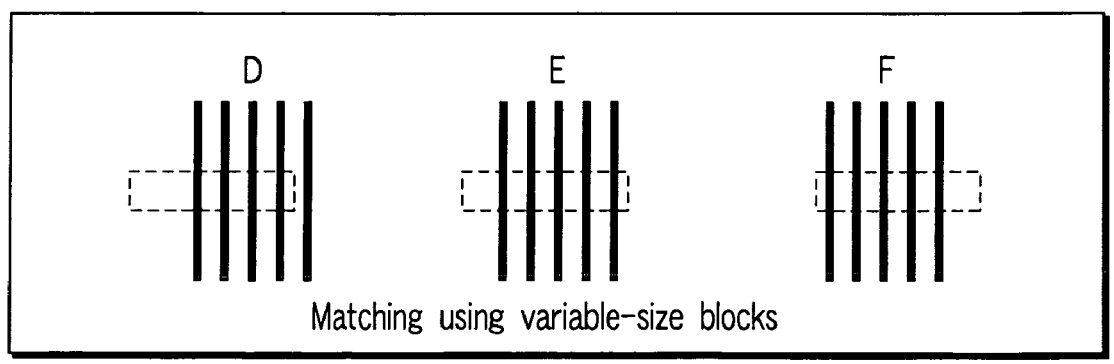
FIG. 6 is another diagram for explaining that accuracy of block matching is influenced by the block size.

In comparison with this, when variable-size blocks D, E, and F having a size which entirely covers the width of the periodical repetitive pattern as illustrated in FIG. 6, the picture patterns included in rectangular areas of the blocks are different from one another. Therefore, it is possible to uniquely detect a correct motion vector.

Specifically, according to the embodiment, it is possible to optimize the size of the variable-size block to a size, which is large enough not to permit confusion caused by a periodical repetitive pattern and is small enough not to include a plurality of moving objects in the block. Further, it is possible to detect movement of an object by using a block having a size satisfying the above condition.

The following methods (a) and (b) can be used for calculating the width of a periodical repetitive pattern to set the size of the variable-size block.

(a) A method of measuring the number of successive occurrences of events, in which a plurality of reliable potential motion vectors are detected, in processing of detecting a vector by using a fixed-size block. In this method, the size of the variable-size block is set to a size (the number of successive occurrences+1) times as large as the size of the fixed-size block.

(b) A method of measuring the number of repetitions of a unit pattern on a line of the input image. In this method, the size of the variable-size block is set to a size (the number of repetitions+1) times as large as the width of the unit pattern.

As described above, in the embodiment, a variable-size block having a variable size is used in block matching. Then, when a plurality of minimum points of the SAD value are generated in processing using the fixed-size block, a minimum point of the SAD value obtained by using the variable-size block is used as a comparative value. Thereby, a vector corresponding to a minimum point (obtained by using the fixed-size block) which is closest to the minimum point of the SAD value obtained by using the variable-size block is adopted as a motion vector.

As described above, since the size of the variable-size block is adaptively varied, a motion vector can be detected with higher accuracy in accordance with the picture pattern of the image, even for images including a periodical repetitive pattern.

The following is the difference between the technique disclosed in the above embodiment and Reference 3 mentioned above.

In Reference 3, at least two blocks having different sizes are used, and a motion vector detected by the smaller block among these blocks is adopted under normal conditions. When a plurality of potential motion vectors are found in vector detection using the smaller block, a vector detected by using the larger block is referred to, and only one vector is selected from the motion vectors obtained by using the smaller block.

In comparison with this, in this embodiment, the size of the larger block is adaptively varied in accordance with the picture pattern of the image. The embodiment is similar to the technique of Reference 3 in respect of using blocks of different sizes. However, the technical idea of the embodiment resides in the point of adaptively varying the block size in accordance with the picture pattern of the image. Specifically, (in the technique of Reference 3,) even when the largest block among blocks of a plurality of sizes is used, there are cases where a plurality of minimum points are generated, depending on the period of a repetitive pattern.

In comparison with this, according to the embodiment of the present invention, it is possible to always find a block size by which only one minimum point is obtained. Therefore, it is possible to further enhance the accuracy of detecting a motion vector by block matching. Further, it is necessary in Reference 3 to prepare blocks of different sizes at a guess, or at random, and perform calculation of SADs for respective blocks. In comparison with this, according to the embodiment of the present invention, it suffices to calculate SAD only for the blocks having enough sizes.

In conclusion, according to the embodiment of the present invention, the size of the variable-size block is adaptively varied, and thereby a motion vector is detected according to the picture pattern with higher accuracy, even for images including a periodical repetitive pattern. Therefore, it is possible to provide an interpolated frame generating method and an interpolated frame generating apparatus, which allow detection of a motion vector with high accuracy regardless of the picture pattern of the image.

The present invention is not limited to the above embodiment. For example, in the above embodiment, a motion vector for a periodical pattern in the horizontal direction of the frame image is detected. As another embodiment, as easily expected, the same effect is obtained by detecting a motion vector for a periodical pattern in the vertical direction of the frame image.

Furthermore, in the above embodiment, explained is processing comprising two steps, that is, processing by using one fixed-size block, and processing by using a variable-size block if necessary. The processing may be divided into more steps. Specifically, a plurality of fixed-size blocks having different sizes may be used, or a plurality of variable-size blocks having different sizes may be used. Further, the size of the variable block may be continuously varied, or discretely varied.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An interpolated frame generating method of generating a new interpolated frame inserted between sequential frames, by using a plurality of input frame images, comprising:

first detecting of detecting at least one potential motion vector by block matching processing between the input frame images, using a first block of a fixed size;

second detecting of detecting a motion vector by block matching processing between the input frame images, using a second block having a size which is variable within a range larger than that of the first block;

adaptively adjusting the size of the second block in accordance with a picture pattern of at least one of the input frame images;

generating the interpolated frame by using the potential motion vector when the number of the potential motion vector detected by the first detecting is one, wherein, the generating is generating the interpolated frame by using a potential motion vector, which is closest to the motion vector detected by the second detecting among the potential motion vectors, when a plurality of motion vectors are detected by the first detecting.

2. The interpolated frame generating method according to claim 1, wherein the adjusting is adjusting the size of the second block to set the number of motion vectors detected by the second detecting to 1.

3. The interpolated frame generating method according to claim 2, wherein the adjusting is setting the size of the second block to a size N times as large as the size of the first block, where N is a natural number of 2 or more.

4. The interpolated frame generating method according to claim 1, wherein the adjusting includes:

measuring the number of successive occurrences of events, in which a plurality of potential motion vectors are detected by the first detecting, in said between the input frame images; and calculating a width of a periodical repetitive pattern in said one of the input frame images based on a result of the measuring, and setting the size of the second block wider than the calculated width.

5. The interpolated frame generating method according to claim 1, wherein the adjusting includes:

measuring the number of repetitions of a unit pattern on a line of said one of the input frame images; and calculating a width of a periodical repetitive pattern in said one of the input frame images based on a result of the measuring, and setting the size of the second block wider than the calculated width.

6. The interpolated frame generating method according to claim 1, wherein the first detecting includes:

calculating an absolute difference value between corresponding pixel values of image blocks in the input frame images; and adopting a motion vector corresponding to a minimum value of a cumulative sum of the absolute difference values as the potential motion vector.

7. An interpolated frame generating apparatus which generates a new interpolated frame inserted between sequential frames, by using a plurality of input frame images, comprising:

a first detecting section configured to detect at least one potential motion vector by block matching processing between the input frame images, using a first block of a fixed size;

a second detecting section configured to detect a motion vector by block matching processing between the input frame images, using a second block having a size which is variable within a range larger than that of the first block;

an adjusting section configured to adaptively adjust the size of the second block in accordance with a picture pattern of at least one of the input frame images; and a generating section configured to generate the interpolated frame by using the potential motion vector when the number of the potential motion vector detected by the first detecting section is one, wherein, the generating section generates the interpolated frame by using a potential motion vector, which is closest to the motion vector detected by the second detecting section among the potential motion vectors, when a plurality of motion vectors are detected by the first detecting section.

8. The interpolated frame generating apparatus according to claim 7, wherein
the adjusting section adjusts the size of the second block to set the number of motion vectors detected by the second detecting section to 1.

9. The interpolated frame generating apparatus according to claim 8, wherein
the adjusting section sets the size of the second block to a size N times as large as the size of the first block, where N is a natural number of 2 or more.

10. The interpolated frame generating apparatus according to claim 7, wherein
the adjusting section performs:
measuring the number of successive occurrences of events, in which a plurality of potential motion vectors are detected by the first detecting section, in said between the input frame images; and
calculating a width of a periodical repetitive pattern in said one of the input frame images based on a result of the measuring, and setting the size of the second block wider than the calculated width.

11. The interpolated frame generating apparatus according to claim 7, wherein
the adjusting section performs:
measuring the number of repetitions of a unit pattern on a line of said one of the input frame images; and
calculating a width of a periodical repetitive pattern in said one of the input frame images based on a result of the measuring, and setting the size of the second block wider than the calculated width.

12. The interpolated frame generating apparatus according to claim 7, wherein
the first detecting section includes:
a calculating section which calculates an absolute difference value between corresponding pixel values of image blocks in the input frame images; and
an adopting section which adopts a motion vector corresponding to a minimum value of a cumulative sum of the absolute difference values as the potential motion vector.

\* \* \* \* \*